United States Patent
Ness

(10) Patent No.: US 7,647,495 B2
(45) Date of Patent: Jan. 12, 2010

(54) METHOD FOR PROTECTING A COMPUTER FROM THE MANIPULATION OF REGISTER CONTENTS AND A CORRESPONDING COMPUTER FOR CARRYING OUT THIS METHOD

(75) Inventor: Werner Ness, Unterschleissheim (DE)

(73) Assignee: Giesecke & Devrient GmbH, Munich (DE)

( * ) Notice: Subject to any disclaimer, the term of this patent is extended or adjusted under 35 U.S.C. 154(b) by 704 days.

(21) Appl. No.: 10/477,140

(22) PCT Filed: May 6, 2002

(86) PCT No.: PCT/EP02/04983

§ 371 (c)(1),
(2), (4) Date: Jun. 14, 2004

(87) PCT Pub. No.: WO02/091168

PCT Pub. Date: Nov. 14, 2002

(65) Prior Publication Data

US 2004/0210737 A1    Oct. 21, 2004

(30) Foreign Application Priority Data

May 10, 2001   (DE)   ................ 101 22 505

(51) Int. Cl.
*G06F 21/00*   (2006.01)

(52) U.S. Cl. .................................... 713/164
(58) Field of Classification Search ........... 713/164
See application file for complete search history.

(56) References Cited

U.S. PATENT DOCUMENTS

| | | | |
|---|---|---|---|
| 5,367,690 A * | 11/1994 | Schiffleger | 711/213 |
| 5,784,577 A | 7/1998 | Jacobson et al. | |
| 6,282,501 B1 * | 8/2001 | Assouad | 702/117 |
| 6,959,391 B1 * | 10/2005 | Baldischweiler | 726/34 |

FOREIGN PATENT DOCUMENTS

| | | | |
|---|---|---|---|
| DE | 19701166 A1 | | 7/1998 |
| DE | 199 18 620 A1 | | 10/2000 |
| WO | WO 00/65442 | * | 11/2000 |

* cited by examiner

*Primary Examiner*—Gilberto Barron, Jr.
*Assistant Examiner*—Devin Almeida
(74) *Attorney, Agent, or Firm*—Rothwell, Figg, Ernst & Manbeck, P.C.

(57) ABSTRACT

For protecting a computer from manipulation of register contents, copies of registers to be protected (6; PC) are created in separate redundancy registers (10a-10c). At each instruction execution, the content of the register to be protected is compared with the copy thereof. The instruction is only executed if there is a match of register contents. If there is a mismatch of register contents, this is interpreted as an indication that the content of the register to be protected has been manipulated, and error handling is performed.

12 Claims, 2 Drawing Sheets

METHOD FOR PROTECTING A COMPUTER FROM THE MANIPULATION OF REGISTER CONTENTS AND A CORRESPONDING COMPUTER FOR CARRYING OUT THIS METHOD

This application is a §371 of PCT Application Ser. No. PCT/EP02/04983, filed May 6, 2002.

This invention relates to a method for protecting a computer, in particular a microcontroller (µC) or microprocessor (µP), from manipulation of register contents. The invention further relates to a chip card making use of such a method or computer.

Protection of parts of a computer from manipulation is imperative for expedient use of a computer in many cases of application, for example with chip cards equipped with computers. It is known to protect registers from manipulation by data encryption.

DE 199 18 620 A1 discloses a method for protecting a computer from manipulation wherein after execution of each program instruction by a central processing unit a logic operation is performed on different register contents, in particular an XOR operation, the result of said operation is stored in a memory, to perform the same operation on the contents of the same registers before execution of the next instruction and compare the obtained operation result with the previously stored operation result. This method has proved useful.

The present invention is intended to state an alternative method for protecting a computer of the abovementioned kind.

For this purpose, the invention provides a method for protecting a computer from manipulation of register contents by creating a copy of the content of a register to be protected and comparing on demand the content of the register to be protected with the copy thereof.

Comparing on demand means for example in particular that the comparison is performed at each execution of an instruction to detect whether the content of the register to be protected was manipulated in the time period between execution of a previous instruction and the now pending instruction execution. This permits the comparison be coupled in time with the increment of the program counter whose content defines the instruction sequence to be executed.

To obtain additional security, it is provided in a preferred embodiment of the invention to store the content of the register to be protected as a copy in a modified form. This prevents certain registers from being recognized by manipulative comparison of register contents and thus the protection being rendered ineffective. The modification does not readily permit a simple comparison of the content of the register to be pro-tected with the copy.

Modification of the data can be done by bitwise inversion. This gives the copy of the content of the register to be protected the form of the one's complement of the content of the register to be protected. It is advantageous here that the comparison can be performed for example by simply subtracting the copy from the content of the register to be protected. If there is a match the subtraction yields the value zero. A nonzero value means a falsification of data in the register to be protected (or in the copy).

In one embodiment of the invention, it is provided that the register to be protected and/or the register containing the copy is shielded. Such shielding can be effected for example by indirectly addressing the relevant register.

As a special embodiment of the invention, a concealment of the physical relations between the register to be protected and the register created for the copy is proposed. Such a concealment can be effected for example by creating the register at a different place from the register to be protected within the semiconductor memory. Creating the register intended for the copy at a place within the semiconductor memory that is separate from the register to be protected can mean an actual spatial separation, but also a virtual or logical separation by modifying the address of the register receiving the copy.

It is especially preferred to compare the content of the register to be protected and the register receiving the copy using a hardware comparator, alternatively a comparison by microcode. This manner of comparison is especially fast, only negligibly delaying the run during program processing. Comparators for comparing register contents bit by bit are known. As an alternative to this possibility, the register contents to be compared can be tested for a match by subtraction/addition. If the copy is an unmodified version of the content of the register to be protected, normal subtraction is effected. In case of a nonzero result, it is signaled to the central processing unit (CPU) of the computer that there has been manipulation. Special program steps can then be executed to handle this detection of manipulation.

If an inverted version of the content of the register to be protected is stored in the register created for the copy, the subtraction can be realized simply by merely adding the two register contents.

In a special embodiment of the invention, the copy of the content of the register to be protected can also be only partly manipulated. An eight bit long register can also be divided into two equally long portions of four bits each to store the first part unmodified and the second part inverted as a copy. This special kind of modification is then taken into account in the comparison to be performed.

The invention furthermore provides a computer in the form of a microcontroller or microprocessor for carrying out the above-described method. Said computer contains a first register memory set with at least one register to be protected, further a second register memory set with at least one redundancy register for receiving the (possibly modified) copy of the register content to be protected, further a comparator for comparing the register contents on demand to initiate handling by the central processing unit of the computer in dependence on the result of comparison.

Finally, the invention also provides a chip card equipped with such a computer.

Hereinafter, some embodiments of the invention will be explained in more detail with reference to the drawing, in which.

Figure 1:
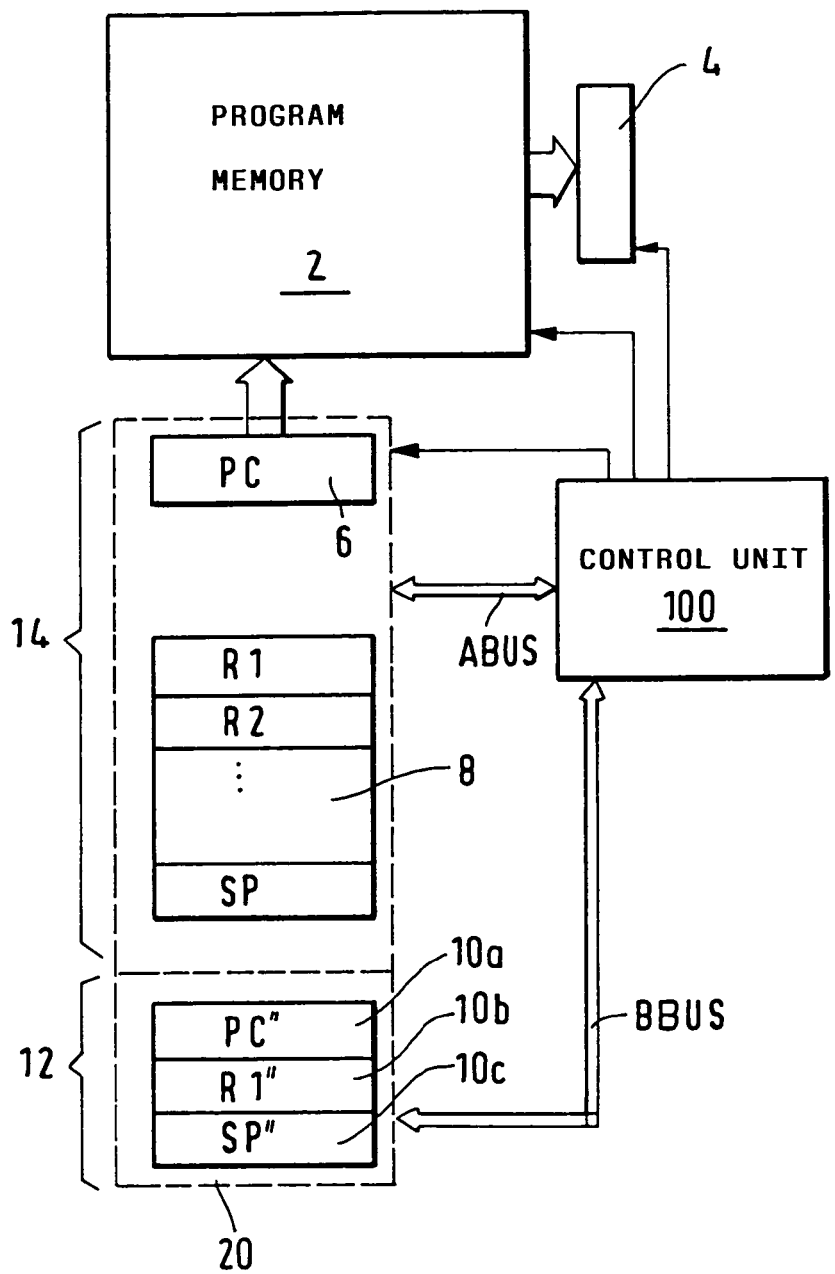
FIG. 1 shows a block diagram of a schematized computer with measures for protecting the content of one or more registers from manipulation.

FIG. 1 shows a computer schematically in the form of a block diagram. The invention relates specifically to a microcontroller (µC) or microprocessor (µP) but is not limited thereto. A special case of application is the chip card with a chip in which contents of certain registers are to be protected from manipulation.

According to FIG. 1, a program to be executed is stored in program memory 2 formed as a ROM. An instruction to be executed is read out from program memory 2 dependent on the content of program counter PC 6. The readout instruction is then in buffer or instruction register 4.

Program counter 6 is part of a register set in RAM 20. The register set is designated 14 here and comprises besides program counter 6 further registers R1, R2, . . . and stack pointer SP. The further registers besides program counter 6 are designated with reference sign 8 in FIG. 1.

At a place in RAM 20 that is logically and/or spatially separate from register set 14 there is second register set 12 with—in the present example three—redundancy registers 10a, 10b and 10c. Said redundancy registers 10a, 10b and 10c store copies of the program counter (PC'), register R1 (R1') and the stack pointer (SP').

Control unit 100 (CPU) is connected with program memory 2, RAM 20 and instruction register 4 via control lines, and is furthermore coupled with RAM 20 via a bus connection, shown schematically here in the form of an ABUS connected to the memory area for register set 14, and a BBUS connected to the memory area for register set 12.

Figure 2:
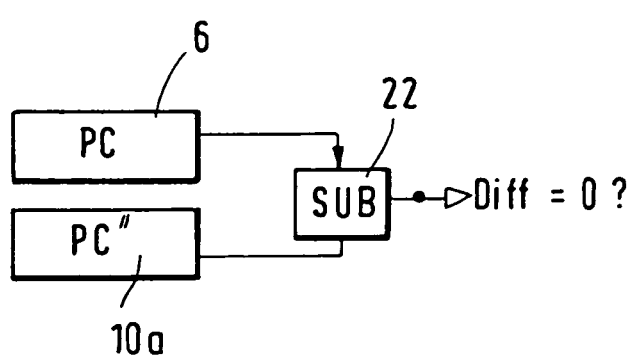
FIG. 2 shows a block diagram of an apparatus for comparing the contents of a register to be protected and a redundancy register.

FIG. 2 shows schematically a comparator array for comparing program counter PC in register 6 to be protected with program counter copy PC' in redundancy register 10a. The two register contents are subtracted by subtracter 22. The result is zero if there is a match of register contents. A nonzero value signals that there has been manipulation of one or the other register 6, 10a (or both registers).

During operation of the computer, program counter PC is compared with its copy PC' previously stored in redundancy register 10a before an instruction is read out from program memory 2. Only if there is a match is the read operation of program memory 2 performed or the read-out instruction, which is then in instruction register 4, actually executed. In case of a mismatch of PC and PC' the execution is blocked and an error routine of little interest here is effected.

In the embodiment of the comparator according to FIG. 2 it has been assumed that copy PC in redundancy register 10a is an exact copy of PC.

Alternatively, the copy can also be stored in the form of a modified version of the content of the register to be protected.

Figure 3:
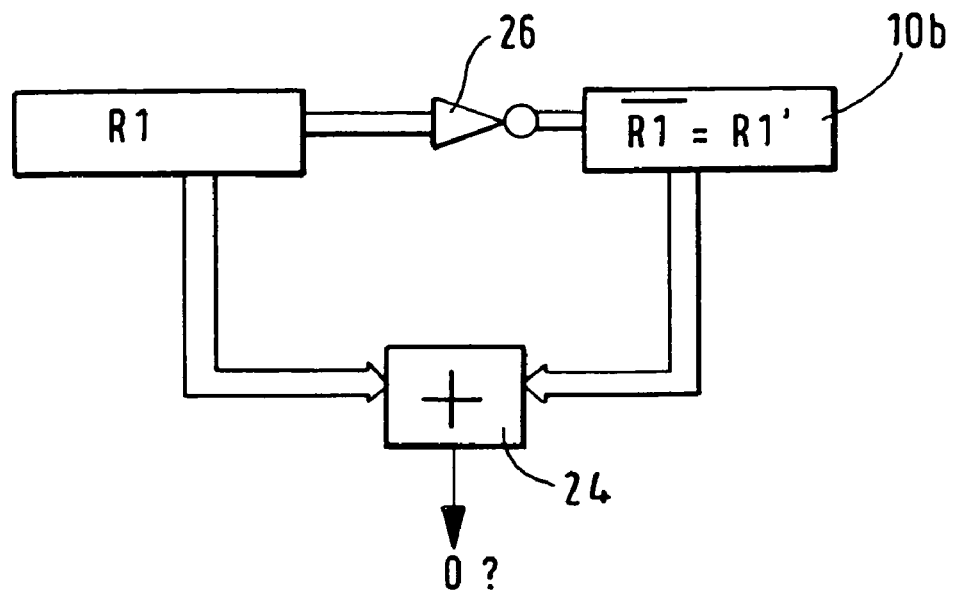
FIG. 3 shows a block diagram of an alternative embodiment to FIG. 2.

FIG. 3 shows as an example of such a modified copy the storage of a bitwise inverted version of the content of register R1. After each instruction execution the content of R1 is bitwise inverted, indicated schematically here by negator 26, so that the bitwise inverted version of the register content of R1 is stored in redundancy register 10b as copy R1'. Due to the bitwise inversion, copy R1' then corresponds to the one's complement of the content of R1. Addition of the two register contents should cause the result of comparison to be zero if there is a match, that is, if there has been no manipulation of a register content.

Figure 4:
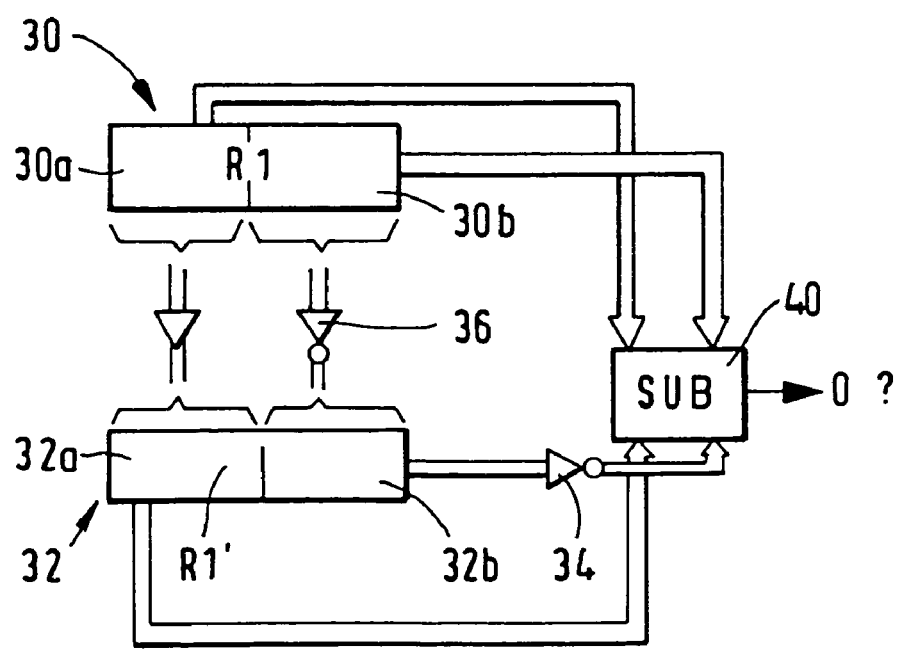
FIG. 4 shows a block diagram of an alternative embodiment to FIG. 2 of a circuit for comparing two register contents.

FIG. 4 shows a further modification for forming the comparator or creating a copy of the content of a register to be protected, shown again here with reference to register R1. According to FIG. 4, register R1 designated 30 here is divided into two equally long halves 30a and 30b with for example four bits each. As copy R1' the two content halves of register 30 are adopted unchanged as a partial copy, on the one hand, and bitwise inverted, on the other hand. The content of left register half 30a is copied unchanged into redundancy register 32, in left half 32a thereof. The content of right register half 30b is loaded bitwise inverted into right half 32b of redundancy register 32, symbolized here by negator 36. Copy R1' of the content of the register to be protected is accordingly a partly identical and partly bitwise inverted version of the register content to be protected.

For performing the comparison with the aid of subtracter 40, respective left halves 30a and 32a of registers 30 and 32 are subtracted, and the version of the data in right half 32b of register 32, bitwise inverted again with the aid of negator 34, is subtracted from right half 30b of register 30. Here, too, there is a match, that is, there has been no manipulation of the register to be protected, only if the result of calculation or comparison yields the result zero.

The invention claimed is:

1. A method for protecting a computer microcontroller or microprocessor, from manipulation of register contents, comprising:
   creating a copy of a register to be protected; and
   comparing on demand the content of the register to be protected and the copy thereof, characterized in that one of the register to be protected and the register containing the copy is shielded.

2. A method according to claim 1, characterized in that the data of the copy are modified relative to the content of the register to be protected.

3. A method according to claim 2, characterized in that the modification is effected by bitwise inversion of the data.

4. A method according to claim 1, characterized in that the shielding of the register is effected by indirectly addressing the register.

5. A method according to claim 1, characterized in that a concealment of the physical relations between the register to be protected and the register (10) containing the copy is performed.

6. A method according to claim 5, characterized in that the concealment is effected by creating the register for the copy at a place that is virtually or spatially separate from the place in the register to be protected.

7. A method according to claim 1, characterized in that the comparison of the contents of the register to be protected and the copy is realized
   a) by means of a hardware comparator, or
   b) by microcode.

8. A method according to claim 1, characterized in that the comparison is performed by bitwise comparison of the data.

9. A method according to claim 1, characterized in that the comparison is performed by subtraction of the register contents.

10. A computer, in particular in the form of a microcontroller or microprocessor, for carrying out the method according to claim 1, characterized by:
    a first register memory set with at least one register to be protected;
    a second register memory set with at least one redundancy register (10a-10c) for receiving a copy of the content of a register to be protected, and
    a comparator for comparing on demand the contents of the register to be protected and the redundancy register.

11. A computer according to claim 10, characterized in that a control unit controls the comparator to perform the comparison at each instruction execution of the computer.

12. A chip card having a computer according to claim 10.

* * * * *